United States Patent
Pelletier et al.

(10) Patent No.: US 9,411,161 B2
(45) Date of Patent: Aug. 9, 2016

(54) DISPLAY SYSTEM COMPRISING A SCREEN COMPRISING AN ARRAY OF THREE-DIMENSIONAL SCATTERING PATTERNS

(71) Applicant: THALES, Neuilly sur Seine (FR)

(72) Inventors: Sebastien Pelletier, Merignac (FR); Aude Gueguen, Bordeaux (FR); Matthieu Grossetete, Cenon (FR); Jean-Luc Bardon, Martignas sur Jalle (FR); Laurent Laluque, Bordeaux (FR)

(73) Assignee: Thales, Neuilly sur Seine (FR)

( * ) Notice: Subject to any disclaimer, the term of this patent is extended or adjusted under 35 U.S.C. 154(b) by 0 days.

(21) Appl. No.: 14/567,675

(22) Filed: Dec. 11, 2014

(65) Prior Publication Data

US 2015/0160459 A1  Jun. 11, 2015

(30) Foreign Application Priority Data

Dec. 11, 2013 (FR) ..................................... 13 02896

(51) Int. Cl.
    *G02B 27/01* (2006.01)
    *G03B 21/60* (2014.01)
    *G02B 27/00* (2006.01)

(52) U.S. Cl.
    CPC ........ *G02B 27/0101* (2013.01); *G02B 27/0012* (2013.01); *G03B 21/60* (2013.01)

(58) Field of Classification Search
    None
    See application file for complete search history.

(56) References Cited

U.S. PATENT DOCUMENTS

| | | | |
|---|---|---|---|
| 9,140,972 B2* | 9/2015 | Pelletier | G02B 27/0172 |
| 9,229,310 B2* | 1/2016 | Pelletier | G02B 5/021 |
| 2005/0206854 A1 | 9/2005 | Katase | |
| 2007/0217005 A1* | 9/2007 | Novet | G03B 21/60 |
| | | | 359/459 |
| 2008/0094705 A1* | 4/2008 | Burkum | G03B 21/60 |
| | | | 359/487.05 |
| 2010/0067107 A1* | 3/2010 | Akiyama | G03B 21/60 |
| | | | 359/459 |
| 2013/0050814 A1* | 2/2013 | Jeon | G03B 21/60 |
| | | | 359/449 |

(Continued)

FOREIGN PATENT DOCUMENTS

| | | |
|---|---|---|
| FR | 2 986 624 A1 | 8/2013 |
| WO | WO 2005/043233 A2 | 5/2005 |
| WO | WO 2013/046858 A1 | 4/2013 |

OTHER PUBLICATIONS

French Search Report for French Counterpart Application No. FR 1302896, 7 pgs. (Sep. 3, 2014).

*Primary Examiner* — Quan-Zhen Wang
*Assistant Examiner* — David Lee
(74) *Attorney, Agent, or Firm* — Blakely, Sokoloff, Taylor & Zafman LLP

(57) ABSTRACT

The general field of the invention is that of display systems comprising an image projector and an associated display screen, the said display system being designed to be used by an observer situated at a given location, the said display screen comprising two transparent and substantially parallel faces, the said display screen comprising, on at least one of its transparent faces, a plurality of regularly distributed light-scattering patterns. The image projector according to the invention illuminating the screen under a plurality of angles of incidence determined by the position and the size of the display screen, the said angles of incidence being centered on a mean angle of incidence, the scattering patterns comprise at least one scattering surface oriented in such a manner as to diffuse the light rays having at least the mean angle of incidence in one or more directions corresponding to the said given location of the observer. Several embodiments are described.

6 Claims, 4 Drawing Sheets

(56) References Cited

U.S. PATENT DOCUMENTS

2013/0100422 A1* 4/2013 Kitabayashi ........... G03B 21/10
353/79

2014/0300967 A1* 10/2014 Tilleman ............ G02B 27/4205
359/567

* cited by examiner

DISPLAY SYSTEM COMPRISING A SCREEN COMPRISING AN ARRAY OF THREE-DIMENSIONAL SCATTERING PATTERNS

BACKGROUND OF THE INVENTION

1. Field of the Invention

The field of the invention is that of display devices projecting an image onto a semi-transparent screen. These devices allow an image to be displayed in front of the user in superposition on the external scene. One of the possible areas of use is the display of information in vehicles, more precisely in the cockpits of aircraft and, in particular, in the cockpits of aircrafts which have large window surface areas.

2. Description of the Prior Art

These display systems allow the attention of the user to be kept on the environment surrounding him/her, while at the same time giving him/her access instantaneously to additional information. In the case of the driving of a vehicle, having information displayed in the visual field of the external environment avoids the user having to search for this information on screens conventionally situated on his/her dashboard.

Various technical solutions exist allowing an image to be projected onto a semitransparent screen. The most common solution is illustrated in FIG. 1. It consists in projecting the image produced by a projector P emitting in the visible spectrum onto the surface of a transparent scattering film E. The diffuser scatters the projected image towards the eye Y of the observer, while at the same time remaining relatively transparent and thus allowing the outside to be viewed. The compromise between transmission and scattering is not simple to find. Scattering films are dedicated to the projection of advertisements onto the display windows of stores. However, the technique is above all used at night, in other words under low ambient lighting conditions. In the daytime, this technique yields mediocre results. Indeed, as can be seen in FIG. 2, the film E scatters the sunlight S in all directions (straight banded arrows in FIG. 2). The transmission of the light is represented by a succession of chevrons in this figure. The film then appears milky, the transparency is limited, the efficiency in reflection and the brightness of the projected image remain low and basically unsatisfactory.

Accordingly, in the application FR 2 986 624 entitled "Optical projector with a semi-transparent projection screen", the applicant provides a display screen comprising a plurality of patterns scattering the light regularly distributed over a transparent surface, where these patterns can comprise a reflecting surface coating. With respect to the previous systems, the semi-transparent screen of this projector both possesses a high transparency and yields a high brightness of the projected image, while at the same time having a limited diffraction.

However, the light rays coming from the projector and scattered by the screen all have a known angle of incidence. In the same way, the illumination by sunlight can only come from certain directions, certain parts of the cockpit forming a natural mask. However, the previous screen is isotropic and does not take into account, in a precise manner, the variations in angle of incidence of the light rays coming from the projector in such a manner as to optimize the efficiencies of scattering towards the eye of the observer.

SUMMARY OF THE INVENTION

The screen according to the invention does not have these drawbacks. It comprises patterns oriented in such a manner as to take into account the positions of the image projector and of the user so as to ensure an optimum diffusion of the light. In addition, the scattering by sunlight is minimized. More precisely, the aim of the invention is a display system comprising an image projector and an associated display screen, the said display system being designed to be used by an observer situated at a given location, the said display screen comprising two transparent and substantially parallel faces, the said display screen comprising, on at least one of its transparent faces, a plurality of regularly distributed scattering patterns, characterized in that, since the image projector illuminates the screen under a plurality of angles of incidence determined by the position and the size of the display screen, the said angles of incidence being centred on a mean angle of incidence, the optical patterns comprise at least one scattering surface oriented in such a manner as to scatter the light rays having at least the mean angle of incidence in one or more directions corresponding to the said given location of the observer.

Advantageously, the orientation of each pattern is adapted to the angle of incidence of the light coming from the image projector and which illuminates the said pattern.

Advantageously, the patterns are holes formed in one of the two transparent faces, each hole comprising a scattering and opaque part turned towards the mean angle of incidence.

Advantageously, the patterns are cylindrical holes formed in one of the two transparent faces, each hole comprising a plane bottom perpendicular to the axis of the cylinder, being scattering and opaque, the axis of the cylinder being parallel to the angle of incidence of the light coming from the image projector and which illuminates the said hole.

Advantageously, the scattering part is plane and inclined with respect to its transparent support face.

Advantageously, the holes are semi-hemispheres comprising a transparent plane part, the semi-hemisphere part being scattering.

Advantageously, the holes are prismatic and comprise a first plane scattering part substantially perpendicular to the transparent face and a second plane inclined part comprising back-reflecting microstructures, the angle of inclination of the second plane part being substantially equal to 45 degrees.

BRIEF DESCRIPTION OF THE DRAWINGS

The invention will be better understood and other advantages will become apparent upon reading the description that follows given by way of non-limiting example and by virtue of the appended figures amongst which.

DETAILED DESCRIPTION

The display system according to the invention comprises an image projector which does not have any particular characteristics and an associated specific display screen. This display screen comprises two transparent and substantially parallel faces. These faces are not necessarily plane and the screen according to the invention may be perfectly incorporated into a curved windscreen, for example.

In a large number of applications, and in particular when the display system is integrated into a cockpit or into an aircraft cabin, as has been said, the position of the projector with respect to the screen is perfectly determined and the eyes of the user occupy a given location which is referred to in some applications as an "eye box". In the same way, the sunlight can only come from certain directions, the cockpit introducing natural masks.

Figure 1:
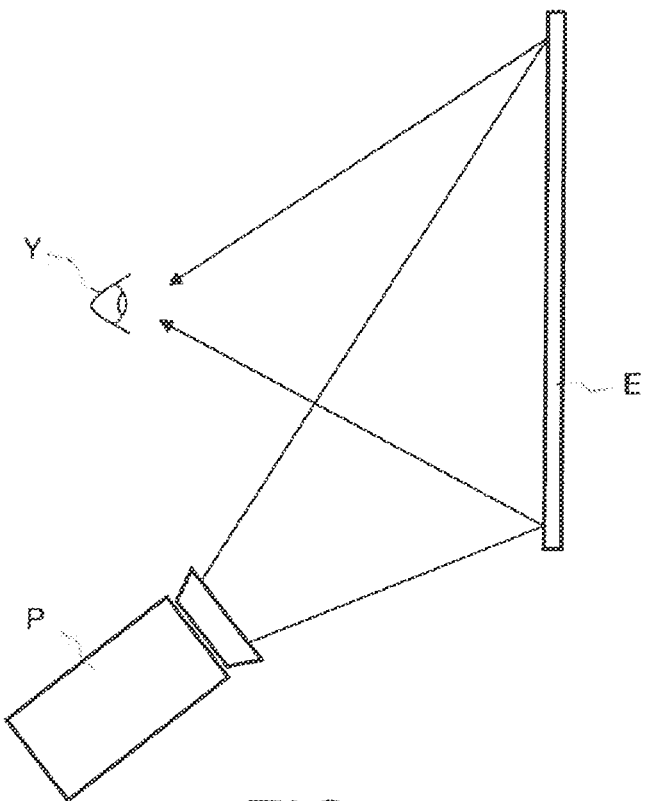
FIG. 1, already discussed, shows the synoptics of a display system with an image projector according to the prior art.
Figure 2:
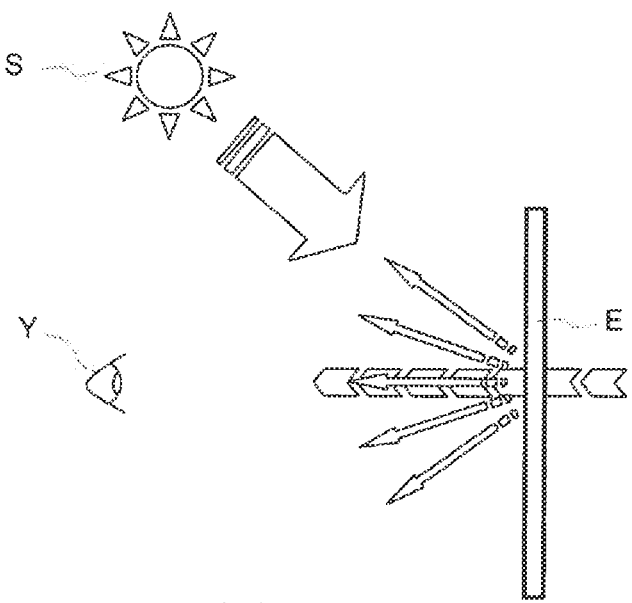
FIG. 2, already discussed, shows the scattering of sunlight on a display screen according to the prior art.
Figure 3:
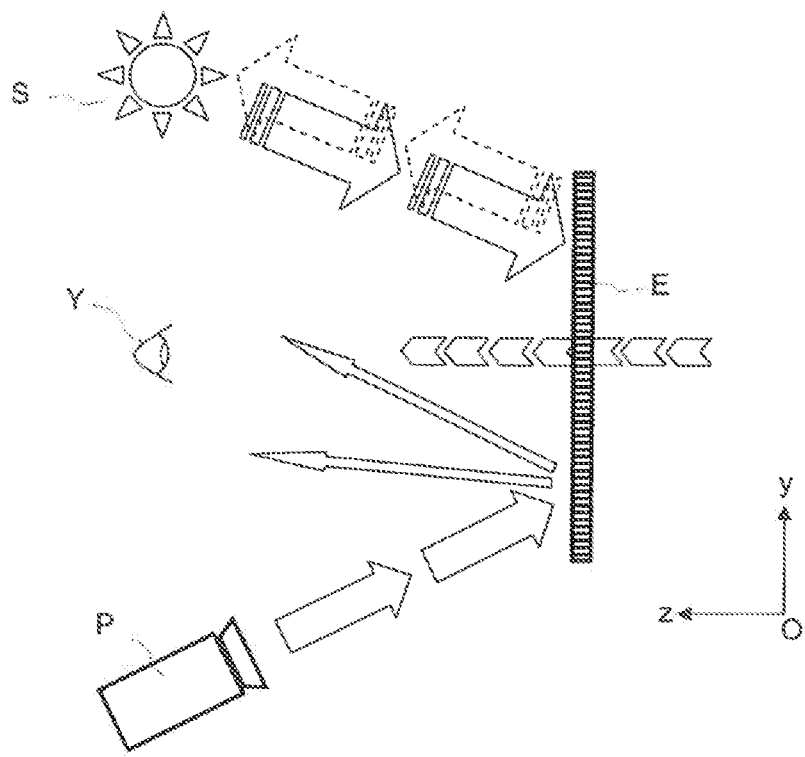
FIG. 3 shows a display system comprising a display screen according to the invention.

The screen according to the invention makes use of this property. By disposing a plurality of patterns scattering the light regularly distributed over one of its transparent faces, they may be arranged in such a manner that, since the image projector illuminates the screen under a plurality of angles of incidence determined by the position and the size of the display screen, the said angles of incidence being centred on a mean angle of incidence, the scattering patterns comprise at least one scattering surface oriented in such a manner as to scatter the light rays having at least the mean angle of incidence in one or more directions corresponding to the said given location of the observer. More precisely, the patterns scatter the light in a very different manner depending on the angle of incidence. This property is illustrated in FIG. 3. The sun's rays S are not scattered towards the eye Y of the observer whereas those coming from the projector P are scattered by the display screen. By way of example, the sun's rays can be back-reflected by the patterns as indicated in FIG. 3.

The display screens according to the invention may be differentiated into two main types, in the first type, all the patterns are strictly identical. In the second type, each pattern is oriented according to the mean angle of incidence on the pattern of the light rays coming from the projector.

Generally speaking, the dimensions of the patterns are of the order of a few tens of microns to a few hundreds of microns. The percentage of surface area of the screen occupied by the patterns determines the transmission factor of the display screen. Thus, if the patterns occupy 20% of the surface area of the screen, the transmission factor not including losses by glass surface reflections cannot exceed 80%. The formation of such patterns does not pose any particular fabrication problems. Indeed, these patterns have essentially a photometric role and do not require the precision of optical systems designed for imaging.

By way of non-limiting examples, FIGS. 4 to 7 show various embodiments of a display screen according to the invention. These figures are all referenced to the same frame of reference (O, x, y, z) and all show either cross-sectional views, or top views as indicated in the figures. The broken arrows in the cross-sectional views indicate the passage of a light ray coming from the projector inside of the pattern, the points of the arrows are directed towards the observer.

Figure 4:
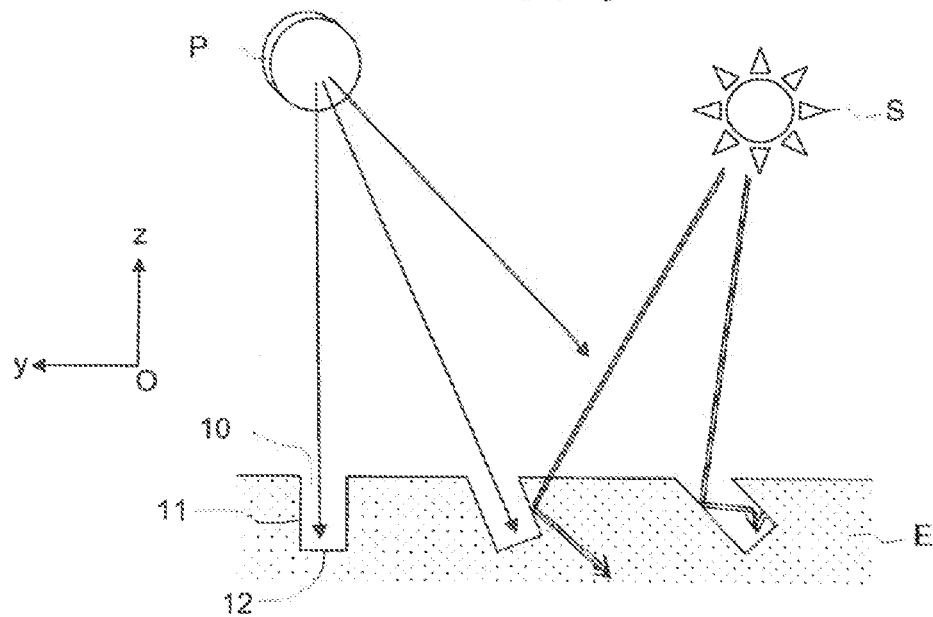
FIG. 4 shows a cross-sectional view of a first embodiment of a display screen according to the invention.

FIG. 4 shows a first embodiment of the patterns 10. Each pattern takes the form of a cylindrical hole formed in the transparent face turned towards the projector P. The cross section of the cylinder can be circular but other shapes are possible. The walls 11 of the cylinder are reflecting. Each hole comprises a plane bottom 12, perpendicular to the axis of the cylinder, which is scattering and opaque. The axis of the cylinder can be parallel to the mean angle of incidence of the light coming from the image projector. In one variant, the axis of each cylinder is oriented towards the angle of incidence of the light which illuminates the said hole. Thus, as can be seen in FIG. 4, each hole is directed towards the projector P. This configuration allows the sunlight S coming from a direction different to that of the projector P to be eliminated.

Figure 5:
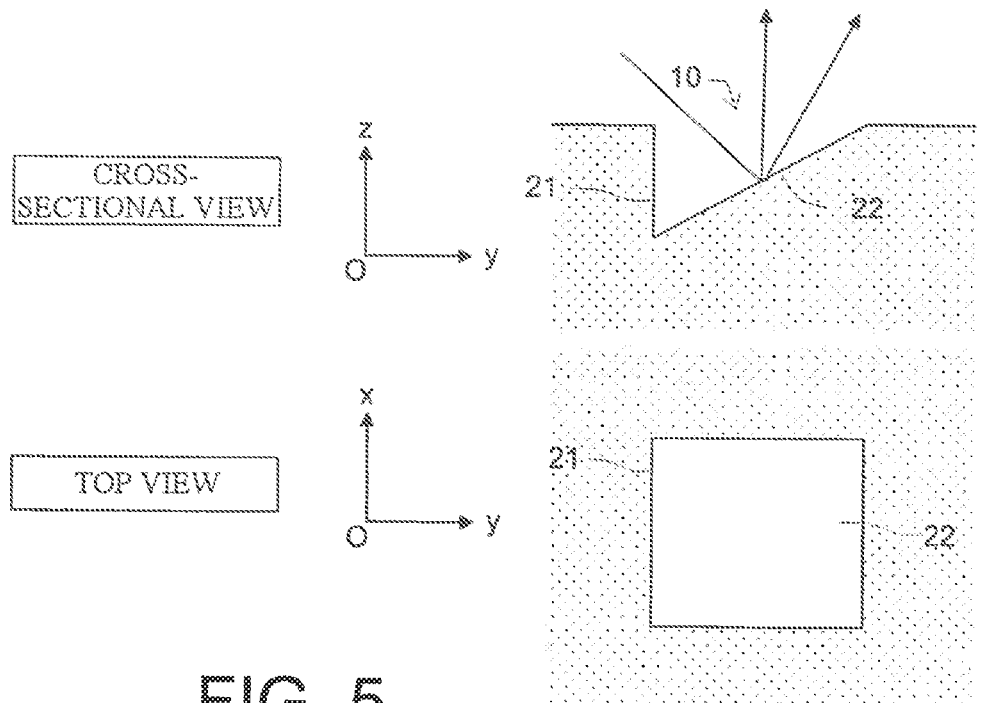
FIG. 5 shows a cross-sectional view and a top view of a second embodiment of a display screen according to the invention.

FIG. 5 shows a second embodiment of the patterns according to the invention. Each pattern 10 comprises an inclined textured plane facet 22. The inclination can be identical for all the patterns. In one variant, the normal to the facet can be the bisector of the two straight lines extending from the centre of the pattern respectively to the centre of the pupil of the projector and to the centre of the eye box. In this case, the inclination of the facet varies with the position of the pattern. The characteristics of the scattering texture covering the facet are adjusted in such a manner as to ensure a virtually uniform illumination within the eye box, and virtually zero outside. The vertical plane face 21 can be transparent.

Figure 6:
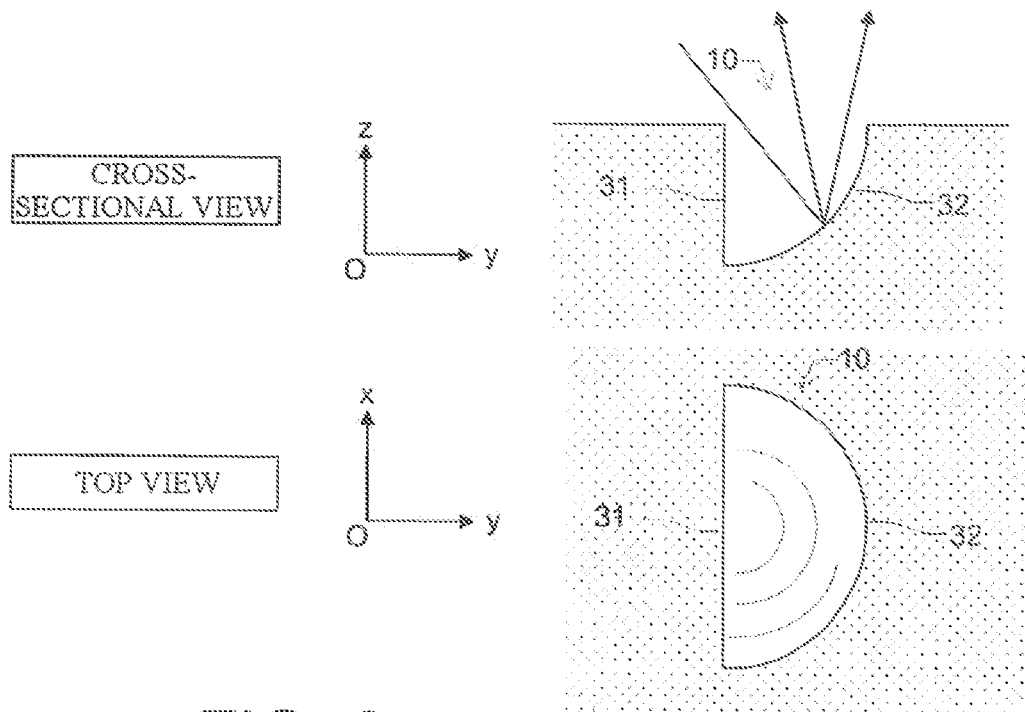
FIG. 6 shows a cross-sectional view and a top view of a third embodiment of a display screen according to the invention.

FIG. 6 shows a third embodiment of the patterns. The holes are then semi-hemispheres comprising a transparent plane part 31, the semi-hemisphere part 32 being scattering. The scattering face 32 is turned towards the projector.

Figure 7:
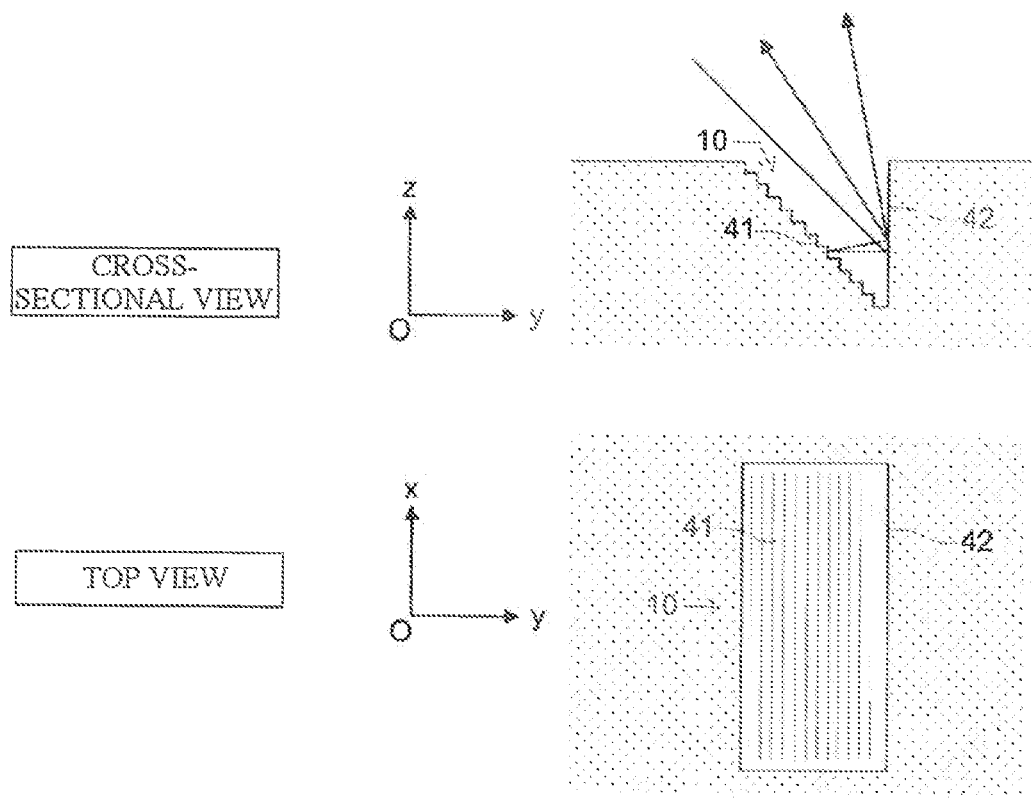
FIG. 7 shows a cross-sectional view and a top view of a fourth embodiment of a display screen according to the invention.

FIG. 7 shows a fourth embodiment of the patterns. In this configuration, the holes of the patterns 10 are prismatic and comprise a first scattering plane part 41 substantially perpendicular to the transparent face and a second inclined plane part 42 comprising back-reflecting microstructures, the angle of inclination of the second plane part being substantially equal to 45 degrees. Here again, the scattering face is turned towards the projector. The back-reflecting microstructures offer the advantage of returning the sunlight in the direction of incidence and, as a consequence, the observer who is necessarily located in a different direction is not dazzled.

What is claimed is:

1. Display system comprising an image projector and an associated display screen, the said display system designed to be used by an observer situated at a given location, the said display screen comprising two transparent and substantially parallel faces, the said display screen comprising, on at least one of its transparent faces, a plurality of regularly distributed scattering patterns, wherein, since the image projector illuminates the screen under a plurality of angles of incidence determined by the position and the size of the display screen, the said angles of incidence being centred on a mean angle of incidence, the optical patterns comprise at least one scattering surface oriented in such a manner as to scatter the light rays having at least the mean angle of incidence in one or more directions corresponding to the said given location of the observer, the patterns being holes formed in one of the two transparent faces, each hole comprising a scattering and opaque part turned towards the mean angle of incidence.

2. Display system according to claim 1, wherein the scattering part is plane and inclined with respect to its transparent support face.

3. Display system according to claim 1, wherein the holes are semi-hemispheres comprising a plane transparent part, the semi-hemisphere part being scattering.

4. Display system according to claim 1, wherein the holes are prismatic and comprise a first plane scattering part substantially perpendicular to the transparent face and a second inclined plane part comprising back-reflecting microstructures, the angle of inclination of the second plane part being substantially equal to 45 degrees.

5. Display system according to claim 1, wherein the orientation of each pattern is adapted to the angle of incidence of the light coming from the image projector and which illuminates the said pattern.

6. Display system according to claim 5, wherein the patterns are cylindrical holes formed in one of the two transparent faces, each hole comprising a plane bottom perpendicular to the axis of the cylinder, being scattering and opaque, the axis of the cylinder being parallel to the angle of incidence of the light coming from the image projector and which illuminates the said hole.

\* \* \* \* \*